United States Patent Office 2,719,102
Patented Sept. 27, 1955

2,719,102

CLOSTRIDIUM PERFRINGENS TOXOID AND PROCESS OF MAKING THE SAME

Earl M. Baldwin, Jr., Omaha, Nebr., assignor to The Corn States Serum Company, Omaha, Nebr., a corporation of Nebraska No Drawing. Application October 28, 1949,
Serial No. 124,233

3 Claims. (Cl. 167—78)

This invention relates to improvements in the manufacture of a toxoid (purified, or in the form of a whole culture toxoid or bacterin) for immunizing sheep, particularly lambs, against enterotoxemia (overeating disease, pulpy kidney disease) caused by *Clostridium perfringens*, type D.

Attempts have been made heretofore to provide a toxoid or bacterin effective to immunize lambs against enterotoxemia, but the products heretofore produced have been subject to certain important disadvantages, including lack of potency and major reactions at the sit of injection. The products of the present invention give uniform immunity after a period of some 7 to 12 days after injection, and permit unrestricted feeding of lambs with minimal losses from enterotoxemia. In the absence of immunization against enterotoxemia, substantial losses of lambs from death from the disease have been common and, almost equally important, there have been substantial economic losses due to feed restrictions imposed on lambs in an effort to cut down the incidence of the disease, resulting in the necessity for extending the feeding period beyond that necessary where unrestricted feeding is possible.

*Clostridium perfringens* type D produces epsilon toxin and protoxin, the latter being the non-toxic precursor of the former. When activated by the bacterial extracellular enzymes, protoxin assumes all the characteristics of epsilon toxin. Other enzymes such as trypsin can activate protoxin. In culture media insufficient extracellular enzymes are produced during bacterial growth to convert all protoxin to epsilon toxin. Thus a true measure of the potential toxicity of a culture of *Clostridium perfringens* type D can not be made until the protoxin is activated by the enzyme trypsin (or some other suitable proteolytic enzyme). Protoxin has the same antigenic characteristics as epsilon toxin and when formalized it is converted to toxoid as is epsilon toxin.

In accordance with the present invention, there is provided a toxoid, which may be free from bacterial cells and other solid matter, or may contain the bacterial cells, i. e., may be a whole culture toxoid or bacterin. This toxoid is obtained by the growth of *Clostridium perfringens*, type D, in a suitable culture medium, followed by formalization to convert protoxin and toxin to toxoid, treatment with alum with subsequent adjustment of the pH of the alum treated product by the addition of an alkaline material, with or without removal of bacterial cells and the like at an appropriate stage in the operation. The growth of the bacteria, carried out in a suitable culture medium at incubator temperature, is carried out for a period of time such that at the time the formaldehyde is added, practically all of the bacterial cells are in the vegetative form. Ordinarily, the growth is continued to approximately the end of the logarithmic growth phase, as at this stage the production of toxin and protoxin is about as great as it becomes in the culture medium. If the growth is continued substantially beyond this time, the formation of spores takes place to a substantial extent without there being any corresponding increase in the amount of toxin and protoxin produced in the culture medium. It is important, in practicing the present invention, to have the bacterial cells in the production culture at the time of addition of formaldehyde in a vegetative form, without any very large proportion of the cells in sporulated form, because this permits reduction of the formaldehyde treatment, used for detoxification to a relatively short time, for example, about 3 days. This in turn is important because exposure of a mixture of production culture and formaldehyde to incubator temperatures results not only in the desired conversion of the toxin and protoxin to toxoid, but also results in degradation or destruction of the toxoid. If the cells are substantially all in the vegetative form, treatment of the production culture with formaldehyde for a period of about 3 days not only results in sterilization of the product and conversion of the toxin and protoxin into toxoid, but also avoids the undue degradation or destruction of the toxoid which accompanies the exposure of a production culture to the action of formaldehyde at incubator temperatures for a period of time sufficient to destroy the bacteria in the spore form.

When the growth has been carried to the required extent, i. e., approximately the end of the logarithmic growth phase which with a properly seeded culture medium may take about 5 hours formaldehyde is added to the culture medium to give a concentration of about 0.3 to 1%, advantageously about 0.5%, and the product is then allowed to stand at incubator temperature for about 3 days. The formaldehyde may be added in any convenient form, for example, as commercial formalin (37%). During this incubation period, the product is detoxified, that is, the toxin and protoxin are converted to toxoid, and the bacteria are killed by the action of formaldehyde. At the end of this incubation period, the product is ready after treatment with alum and adjustment of its pH to about 6.0 to 8.0, to be filled into final containers for marketing. If it is not to be put into the final containers promptly at the end of an incubation period of 2 to 4 days, it should be kept under refrigeration until it is filled into the final containers, because destruction or degradation of the toxoid takes place, relatively rapidly at incubator temperature and less rapidly at room temperature, unless the material is kept under refrigeration. At refrigerator temperatures, e. g., 3 to 4° C., loss of toxoid is insignificant.

The product, before being placed in final containers, is advantageously treated with alum (aluminum potassium sulfate) to enhance or promote its antigenic properties. Thus, before putting the product into the final containers alum may be added to give a concentration of about 1%. If the product is subjected to treatment with alum, which in appropriate concentrations of about 1%, reduces its pH to about 4.5, I have found it important to subsequently add sufficient alkaline material, such as sodium hydroxide or other alkaline material to bring the pH from about 6.0 to about 8.0, advantageously about 7.0. I have found that at the reduced pH imparted to the material by the alum, there is a tendency for the toxoid to be degraded or destroyed, with more or less rapid reduction of the potency of the product, whereas if the pH of the material is adjusted to about 6.0 to about 8.0 after the addition of the alum, this loss in potency on standing is minimal.

The product produced in accordance with the invention as outlined above has substantial stability, retaining, under refrigeration, its antigenic or immunizing property for a period substantially longer than required for commercial distribution and use.

The product may be produced in the form of a whole culture toxoid, i. e., without removal of the bacterial cells or other solids. On the other hand, it may be produced as a purified toxoid, for example, by removing bacterial cells or the like before the addition of the alum, removing the precipitate formed on the addition of the alum, washing it and resuspending it in a suitable menstruum, for example, physiological saline.

The whole culture toxoid or bacterin described above in dosages of about 5 cc. will, after a period of 7 to 12 days following injection, immunize lambs against enterotoxemia for a period more than adequate to protect them during the normal feeding period. For a short time of 7 to 12 days following injection, the usual care with respect to diet, exposure and the like should be taken as the animals require 7 to 12 days to acquire the desired immunity. Administration of the product is subcutaneous.

The invention will be further illustrated by the following specific description of the production of a whole culture toxoid or bacterin, but the invention is not limited thereto.

A suitable toxogenic strain of *Clostridium perfringens*, type D, is obtained and permitted to age until fully sporulated. From this, a preseed culture is produced by inoculating a suitable medium, and the culture is then held at incubator temperature until the spores start to or are fully germinated to vegetative cells, as evidenced by turbidity and gas evolution. The ordinary incubation time is from about 3 to about 11 hours, but this may vary. A suitable culture medium is obtained by preparation of a broth from pork or veal muscle as by removing excess fat, grinding, adding distilled water at the rate of one liter per pound, adding 0.5% of glacial acetic acid and 0.5% sodium chloride, letting the mixture stand overnight under refrigeration, boiling and removing coarse particles by filtration or centrifugation. A liver broth is prepared from fresh pork or veal liver by slicing, adding distilled water at the rate of one liter per pound, letting the mixture stand in the refrigerator overnight, boiling until the liver is coagulated and removing coarse particles by filtration or centrifugation. The two broths are combined in equal proportions and to the mixture is added 1% proteose peptone, 0.2% dibasic potassium phosphate, 0.1% sodium thioglycollate and 0.05% of agar agar, these being dissolved in the broth by heating. The pH is then adjusted to about 8.0 with caustic soda or other alkaline material and filtered or centrifuged. The medium is then distributed in suitable containers, about 10% of ground cooked liver is added to each container and the medium is sterilized by steam under pressure.

After the spores have started to or have fully germinated to vegetative cells, the culture is used to inoculate the seed culture medium. The medium for the seed culture is the same as that used for the preseed culture except that no sodium thioglycollate, agar agar or ground cooked liver are included in the formula. The preseed culture is added to the culture medium for growing the seed in proportions of about 5 cc. of the preseed culture for 3500 cc. of medium. This culture, after the addition of the preseed culture, is incubated overnight, for example, for about 12 hours. After this incubation the seed culture is added to the production medium, of the same composition as the seed culture medium, previously prepared and sterilized, at the rate of about 50 to 100 cc. per 3500 cc. of production culture medium. The seed culture should be actively growing at the time it is added to the production culture medium. After seeding, the production culture medium is kept at incubator temperature (37° C.) until the logarithmic growing phase is approximately complete. About 5 hours is ordinarily required for this growth period. At the end of it there are practically no spores present in the culture medium. Continued growth beyond this period results in sporulation, which should be avoided if practical to permit the treatment of the culture medium with formaldehyde for a period of about 2 to 4 days to kill substantially all of the bacteria present and insure sterility.

Growth of the bacteria in the preseed, seed and production media is anaerobic.

At the end of the logarithmic growth phase, formaldehyde in the form of a 37% aqueous solution, is added to give a concentration of 0.5%, and the product is permitted to stand at incubator temperature for 2 to 4 days, at which time the toxin and protoxin have been converted to toxoid and the bacteria have been killed so that it is safe to fill the product into marketing containers. The product may be used in this form, but advantageously is treated with alum to intensify its antigenic properties. Thus, after the product has been incubated with 0.5% formaldehyde for 2 to 4 days, alum as an aqueous solution is added to give a concentration of about 1%. This is followed by the addition of sufficient sodium hydroxide or other alkaline material to adjust the pH to 7.0.

At this stage the product is filled into final containers for distribution, using the customary precautions as to sterility, safety and purity.

If the material after the addition of the formaldehyde and incubation for 2 to 4 days is not immediately filled into final containers with or without the alum addition, it should be kept under refrigeration, and after the material is incorporated in the final containers it should thereafter be kept under refrigeration to minimize destruction or degradation of the toxoid.

I claim:

1. The process of producing a toxoid product effective to immunize sheep against enterotoxemia which includes growing toxogenic *Clostridium perfringens*, type D, in a suitable culture medium until the growth has approximately reached the end of the logarithmic phase, adding formaldehyde to the culture medium and incubating the culture medium containing the formaldehyde for a period of about 2 to 4 days, whereby the toxin and protoxin in the culture medium is converted to toxoid and the bacteria are killed.

2. The process as in claim 1 in which at the end of the said incubation period, alum is added to the product and thereafter the pH of the product is adjusted to the range of about 6.0 to about 8.0.

3. The product produced by the process of claim 2.

References Cited in the file of this patent

UNITED STATES PATENTS 2,125,533    Winegarden _____ Aug. 2, 1938

OTHER REFERENCES

Gershenfeld, "Bacteriology and Allied Subjects," pp. 14, 477–479, Publ. 1945 by Mack Publ. Co., Easton, Pa.

Muth et al., article in Am. Jour. Vet. Res., July 1946, pp. 355–357.

Baldwin et al., article in Am. Jour. Vet. Research, July 1948, pp. 296–303.

"The Biology of Bacteria," by Henrici, pp. 147 and 148, Publ. 1934 by U. of Minnesota Press.

Kelser, "Manual of Veterinary Bacteriology," 5th ed., 1948 (May), pp. 360–363.